J. J. KROHN.
STAVE JOINTER.
APPLICATION FILED NOV. 27, 1908.

1,054,567.

Patented Feb. 25, 1913.
8 SHEETS—SHEET 1.

WITNESSES

INVENTOR
Julius John Krohn
BY Munn & Co.
ATTORNEYS

J. J. KROHN.
STAVE JOINTER.
APPLICATION FILED NOV. 27, 1908.

1,054,567.

Patented Feb. 25, 1913.
8 SHEETS—SHEET 4.

WITNESSES

INVENTOR
Julius John Krohn
BY Munn & Co.
ATTORNEYS

J. J. KROHN.
STAVE JOINTER.
APPLICATION FILED NOV. 27, 1908.

1,054,567.

Patented Feb. 25, 1913.
8 SHEETS—SHEET 5.

WITNESSES:

INVENTOR
Julius John Krohn
BY
ATTORNEYS

J. J. KROHN.
STAVE JOINTER.
APPLICATION FILED NOV. 27, 1908.

1,054,567.

Patented Feb. 25, 1913.
8 SHEETS—SHEET 6.

INVENTOR
Julius John Krohn
BY
ATTORNEYS

UNITED STATES PATENT OFFICE.

JULIUS JOHN KROHN, OF ARCATA, CALIFORNIA, ASSIGNOR TO CALIFORNIA BARREL CO., OF SAN FRANCISCO, CALIFORNIA, A CORPORATION.

STAVE-JOINTER.

1,054,567. Specification of Letters Patent. Patented Feb. 25, 1913.

Application filed November 27, 1908. Serial No. 464,762.

*To all whom it may concern:*

Be it known that I, JULIUS JOHN KROHN, a citizen of the United States, and a resident of Arcata, in the county of Humboldt and State of California, have invented new and useful Improvements in Stave-Jointers, of which the following is a full, clear, and exact description.

This invention relates to automatic machines for jointing barrel staves.

One object of the invention is to provide a machine which will automatically joint the edges of the barrel-staves in such a manner that narrow and wide staves shall have the proper bevel at their edges.

A further object is to provide a feeding means which shall be positive in its action and prevent substantial lateral movement of the staves during the cutting operation.

The invention consists of novel features and parts and combinations of the same, as will be more fully described hereinafter and then pointed out in the claims.

Reference is to be had to the accompanying drawings forming a part of this specification, in which similar characters of reference indicate corresponding parts in all the views.

Figures 2, 7:
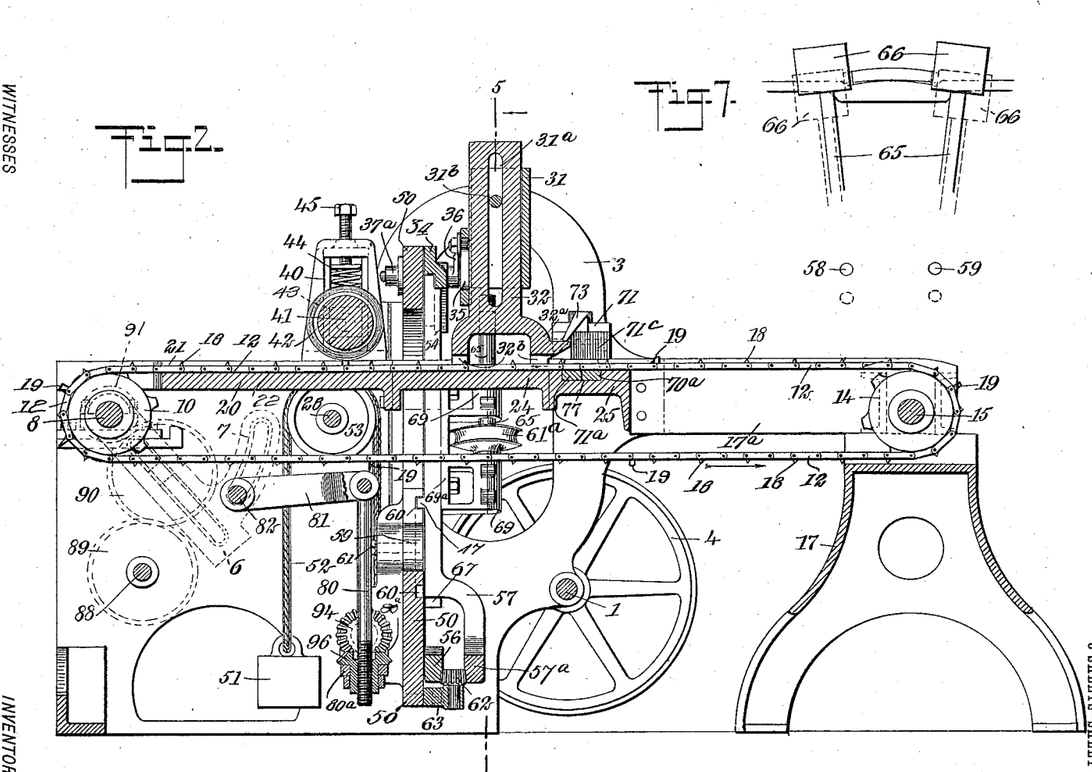
Fig. 2 is a central vertical section, on the line 2—2 in Fig. 1.
Fig. 7 is a diagrammatic view showing the cutter heads in their upper and lower positions.

Power for operating the present machine is received thereon by a pulley 4. The pulley 4 is fixedly mounted upon a shaft 1, which is suitably mounted in bearings provided in side frames 2 and 3. On the end of the shaft 1 opposite that whereon the pulley 4 is mounted, there is mounted a small driving pulley 5. The pulley 5 is connected in driving relation with a large pulley 9 through a driving belt 5ª. The pulley 9 is mounted on a cross shaft 8, having bearings in and extended between the said sides 2 and 3. The shaft 8 is a driving shaft, and the motive power of the distinctive actions of the various instrumentalities herein described is transmitted from this shaft 8. The feeding chain 12 is directly connected thereto, while the mechanism for raising and lowering the cutters with which this machine is provided, is operated from the shaft 88, as best seen in Fig. 2, which is connected to this shaft 8 through the interposed chain of gears 91, 90 and 89. By this arrangement the operation of the feeding chain whereby the staves are advanced is harmoniously timed with the raising and lowering of the cutters which operate to shape the edges of the staves.

The feeding mechanism for the staves to the machine consists primarily in the endless sprocket chain 12. The chain 12 is suitably linked, the link blocks thereof being provided with sharpened spurs 18, 18, upstanding, and adapted to be embedded in the material forming the staves. A groove 22 is formed in the center of a runway 21, formed in the table 20. At the feeding end of the machine the chain extends over and is held in toothed engagement with a sprocket wheel 14, mounted upon a shaft 15 provided in an independent pedestal 17, to which the frame of the machine is connected by means of the extension side plates 17ª. Secured upon the chain 12 are feed dogs 19, 19. While the spurs 18, 18 prevent independent lateral movement of the staves, the dogs 19, 19 feed the staves between the cutters.

The cutters 66, 66 with which this machine is provided may be of any size or shape. They are suitably mounted upon the arbors 65, 65, the ends whereof are screw-threaded to receive the clamping nuts 46 usual to machines of this character. The arbors are suitably mounted in bearings 68, 68, and 69, 69. There are two bearings, and each bearing is extended from a face plate 69ª. The face plates are bolted to swinging frames 56 and 57 respectively.

The frames 56 and 57 are provided with pivots 58 and 59, which are extended through circular grooves 60ª, 60ª, formed in the elevator 50. The frames 56 and 57 are provided with quadrant extensions 56ª and 57ª respectively, upon which extensions are formed rack teeth 62ª mounted in toothed engagement with an idler pinion 62. The idler 62 is suitably mounted in a bearing formed in a bracket 63, which is fixedly secured upon the elevator 50. By means of the connection thus described between the quadrant ends of the two swinging frames, they being held in engagement with the same pinion, the swinging action of the frames is synchronized, compelling each of the cutters 66 to swing to and from the median vertical line of the machine in equal degree. To guide the frames 56 and 57, there is formed on each the circular extension 47, which is seated in the circular groove 60 formed in the elevator 50.

Figure 3:
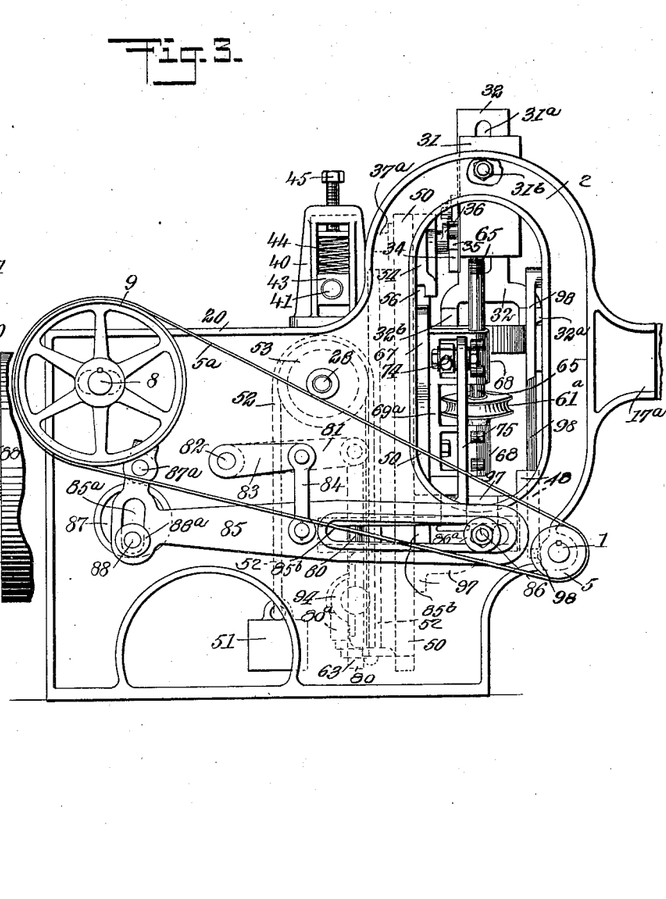
Fig. 3 is a side elevation of the main portion of the machine.
Figure 4:
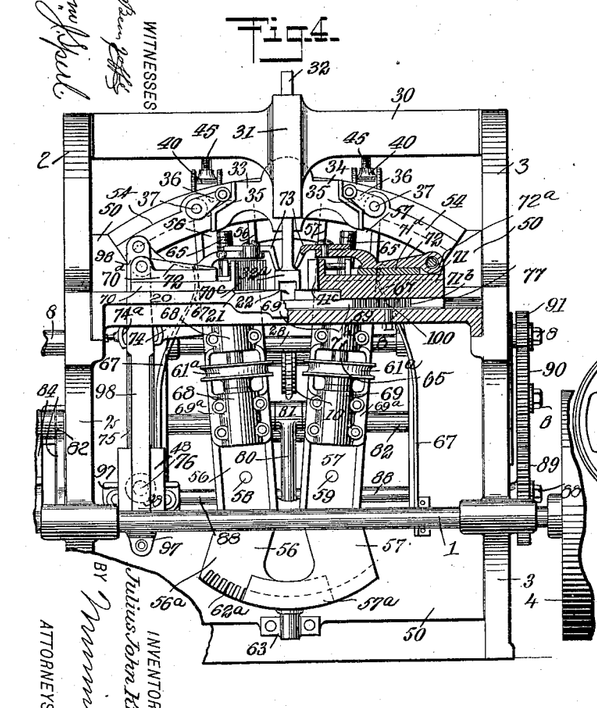
Fig. 4 is a vertical section, on the line 4—4 of Fig. 1.

The swinging action just above described for the frames 56 and 57 carrying the cutters 66 is caused primarily by the spread of the gate blocks 70 and 71. The gate blocks 70 and 71 are mounted in a groove 77, and for this purpose are provided with extensions 70ª and 71ª. The extensions are spaced apart under the block 71, and are there provided with racks 71ᵇ, which are tooth engaged with an idler pinion 100. By this engagement between the two racks 71ᵇ formed on each of the extensions 70ª and 71ª, and the idler 100, any lateral movement of either of the blocks is transmitted to the other block. The upper portions of the blocks 70 and 71 rest upon the table 20. The blocks are provided with beveled faces 70ᶜ and 71ᶜ. These beveled faces are moved to and from each other. In this movement they are assisted by the heavy leaf springs 67, 67, which are fixedly secured upon the elevator 50, as seen in Figs. 3 and 4 of the drawings, and which bear against the frames 56 and 57 at the upper ends thereof. The inclined faces 70ᶜ and 71ᶜ are located in advance of the cutters 66 and in advance of the presser foot 32; therefore, the staves, when being fed to the machine, pass first between the beveled faces 70ᶜ and 71ᶜ of the blocks 70 and 71. The blocks 70 and 71 yield laterally to the wedging pressure of the end of the stave as the same is forced between the faces. As stated, the spread of the blocks 70 and 71 is equalized by the idler 100, so that the faces 70ᶜ and 71ᶜ spread equally from the median line of the feed chain 12 and the center of the stave held thereon.

Figure 5:
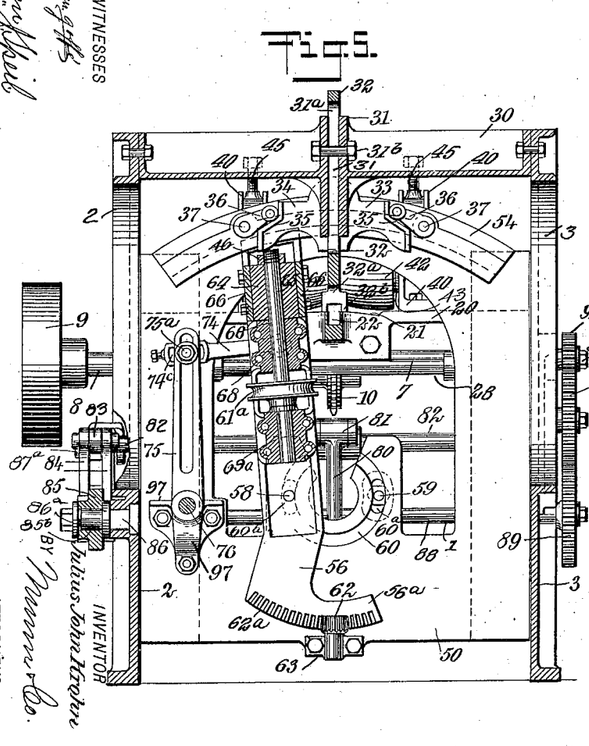
Fig. 5 is a vertical cross section of the machine, taken on the line 5—5 as indicated in Fig. 2, one of the frames supporting the cutters being removed.
Figures 11, 12:
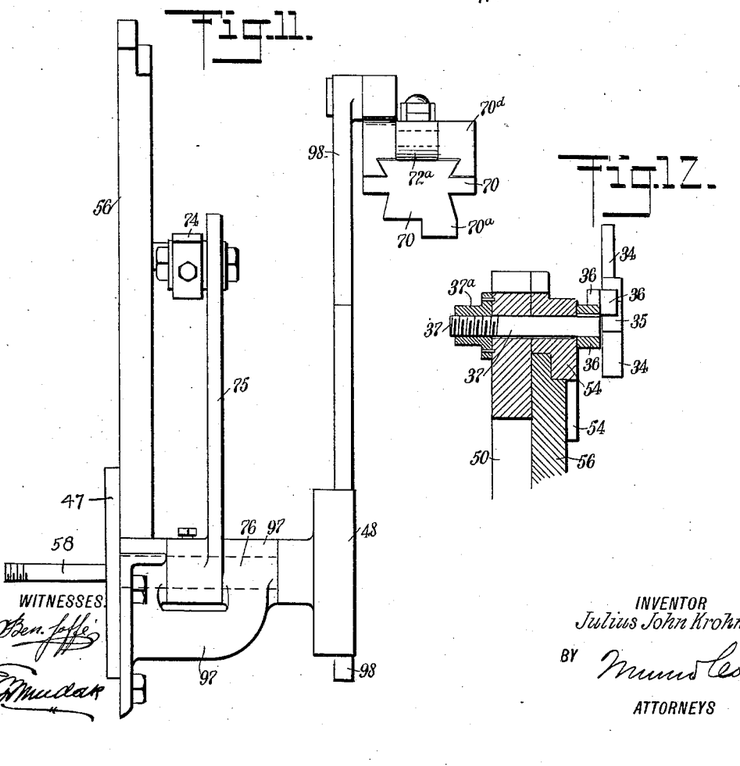
Fig. 11 is a detailed view on an enlarged scale, and in side elevation, of the spreading block, cutter frame, and transmission mechanism for operating the same in unison.
Fig. 12 is a detailed view in section showing the elevator, the cutter frame, the clamping plate, and the operating mechanism therefor.
Figures 13, 17, 18:
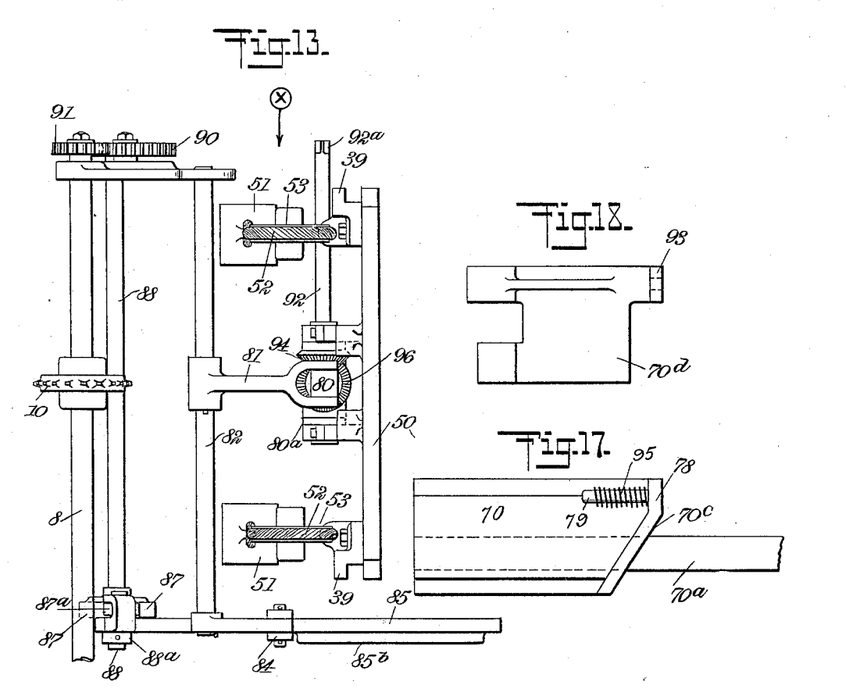
Fig. 13 is a detailed view in plan, showing the elevator frame and mechanism for operating the same.
Fig. 17 is a detailed view in plan, of one of the sliding blocks for guiding the staves while being introduced to the cutters of the machine.
Fig. 18 is a detailed view in plan of the block connecting the guide block shown in Fig. 17 with the mechanism shown in Fig. 16 for spreading the cutter supporting frames.
Figure 14:
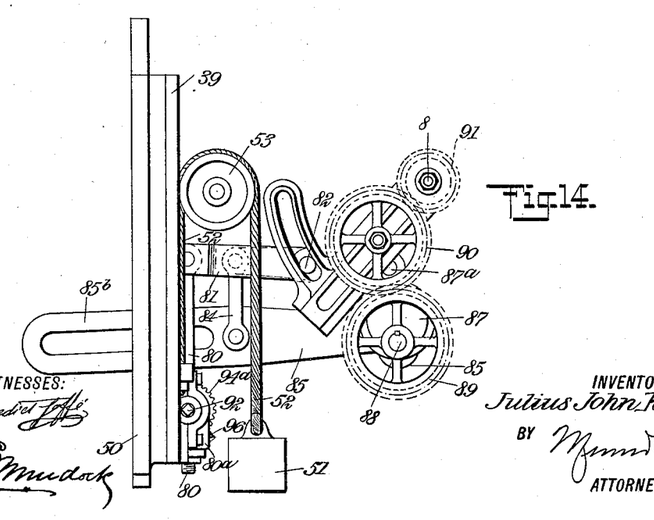
Fig. 14 is a side elevation of the mechanism shown in Fig. 13, seen from the side thereof indicated by the arrow $x$ in said Fig. 13.
Figure 15:
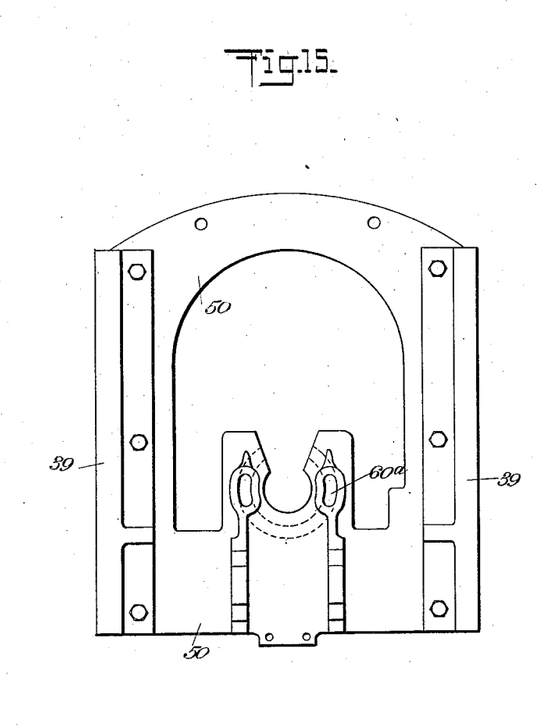
Fig. 15 is a detailed view in rear elevation, of the elevator frame, the said frame being stripped of the mechanism usually carried thereby.
Figure 16:
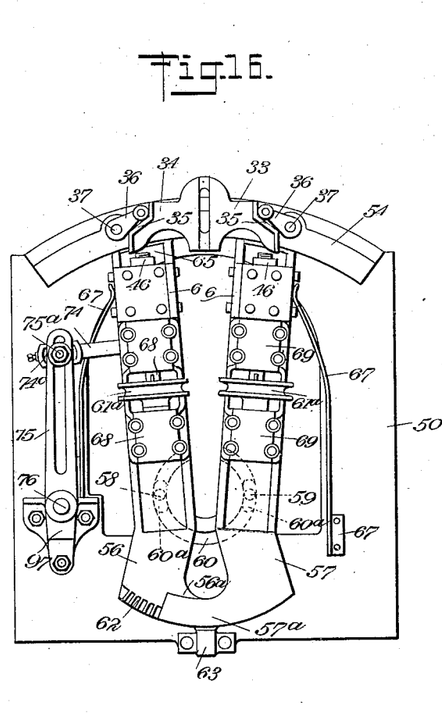
Fig. 16 is a front elevation of the elevator frame showing in conjunction therewith, and as mounted thereon, the carrying frames for the cutters and the clamping and operating mechanisms for the said cutter supporting frames.

Connected to the block 70 is an arm 98 (see Figs. 3, 4 and 11). The arm 98 is slidably mounted in a guide block 48 fixedly mounted upon a shaft 76 (see Figs. 4, 5 and 11), which shaft 76 is mounted in bearings formed in the bracket 97, bolted to the elevator 50. The shaft 76 has fixedly attached thereto a rocking arm 75, which is provided with a longitudinal slot, as shown in the drawings (see Fig. 5). Adjustably connected with the arm 75 is a pitman 74, which is pivotally connected to the swinging frame 56. The pitman 74 is provided with an elongated slot 74ᶜ at the end adjacent to the arm 75. The pitman 74 and arm 75 are connected by a sliding block 75ª, whereby the extension of the pitman 74 is adjusted.

It will be seen that with the initial spreading of the blocks 70 and 71, the arm 98, the shaft 76, and the arm 75 are rocked in proportion to the spread of the said blocks 70 and 71. By reason of the connection between the swinging frame 56 and the arm 75, the frame 56 is moved in unison with the arm 75. By reason of the connection between the frame 56 and the frame 57, through the pinion 62, the motion produced in the frame 56 is equally produced in the frame 57, but in the opposite direction from the median line. Therefore, with the initial entrance of the stave, which spreads the blocks 70 and 71, the cutters 66, 66, mounted on the arbors 65, 65, are separated a distance equal to the width of the end of the stave. If the end of the stave be wide, the cutters are separated to greater width; if the end of the stave be narrow, the cutters are separated to a lesser width. But in all instances it will be understood that the movement of the frames carrying the cutters is around a certain center, which center has been adjusted to coincide with the cylindrical center of the barrel for which the stave is intended.

As stated, the blocks 70 and 71 are located in advance of the presser foot 32 and the cutters 66, 66, mounted on the arbors 65, 65. With the insertion of the stave below the pressure foot 32, the frames 56 and 57 are locked in their separate position, and do not thereafter move to change their relative dispositions, as is hereinafter set forth. The pressure foot 32 is provided with a shoe 32$^a$, inclined in a forward and upward direction. The shoe 32$^a$ bears downward upon the stave as the same passes under the said shoe and forces the same upon the spurs 18, 18 of the chain 12 into the wood of the stave. The presser foot is mounted between guide plates 31, 31. The upper extension of the foot is provided with a slot 31$^a$ through which extends a bolt 31$^b$.

At the rear edge of the pressure foot 32 there is secured a plate having lateral extensions 33 and 34. On the upper edge of the extensions 33 and 34 are formed the inclined planes 35, 35. (See Figs. 4 and 5 of the drawings.) The inclined planes 35, 35 are provided to form cam surfaces for the crank arms 36, 36, which are fixedly attached to the short shafts 37, 37, mounted in the elevator 50. A guide plate 54 is loosely mounted upon the said elevator to form in conjunction therewith a runway for the upper ends of the frames 56 and 57.

The ends of the shafts 37 are threaded and provided with fixed clamp nuts 37$^a$, (see Figs. 1 and 6,) the pitch of which is sufficient to draw the said nut hard up on the shaft and to jam the plate 54 in holding engagement upon the ends of the frames 56 and 57. This action occurs just after the advanced end of the stave enters under the presser foot 32, and locks the frames 56 and 57 at the angle to which the separation of the blocks 70 and 71 have disposed the said frames 56 and 57.

It will be seen that throughout the operation of cutting the staves, the cutters remain relatively fixed so that the pitch of the edges of the stave at the small ends is identical with the pitch of the said edges at the bilge.

The variation in width of the stave from the ends to the middle, is produced by a mechanism operating the elevator 50 in such manner that the same begins to fall with the initial introduction of the stave to the cutters 66 and when the said cutters are in their closest approximation. The fall of the elevator 50 is continued until at the lowermost position of the elevator, the widest section of the stave is being formed. The elevator 50 from thence is raised until the stave is carried from between the cutters. The last or following end of the stave is formed of the narrowed dimension corresponding to that formed at the forward or advanced end of the said stave. The rise and fall of the elevator above described is produced by means of the heavy lever 85, the crank arm 83, the connecting link 84, the shaft 82, the crank arm 81, the lifting rod 80, the eccentric 87, the pin 87$^a$, the shaft 88, the connecting gears 89, 90 and 91, the shaft 8 and the pulley 9.

As stated, the pulley 9 is in belted engagement with the driving pulley 5 on the driving shaft 1 of the machine. Through the gears 89, 90 and 91, power is transmitted from the shaft 8 to the shaft 88. On the outer end of the shaft 88 is fixedly mounted the eccentric cam wheel 87. The end of the shaft is provided with a nut 88$^a$ which holds the lever 85 in guided relation to the shaft 88 and the cam 87. For this purpose the lever 85 is provided with a slot 85$^a$ which straddles the end of the shaft 88. The extension from the end of the lever 85 is provided with a pin 87$^a$, which extends over and rides upon the eccentric 87. As the shaft 88 is rotated, the eccentric 87 raises and lowers the pin 87$^a$, and the lever 85 connected therewith. The lever 85 is provided with an elongated slot 85$^b$ provided at the opposite end to receive the fulcrum pivot 86. The pivot 86 is provided with a suitable roving block and clamp nut 86$^a$, whereby the pivot is set rigidly in the side 3 of the machine, and whereby the same may be adjusted longitudinally to increase or diminish the length of the stroke of the lever 85 at the point where the link 84 is connected thereto. The rise and fall of the lever 85 is transmitted through the link 84 and the arm 83 to the shaft 82, which is suitably mounted in bearings formed in the sides of the machine, and is provided with the arm 81 fixedly attached thereto at a position about central with the machine. (See Figs. 3 to 6 inclusive.) The arm 81 is pivotally connected with the lifting rod 80, which is attached to the hanger plate 80$^a$.

Figure 6:
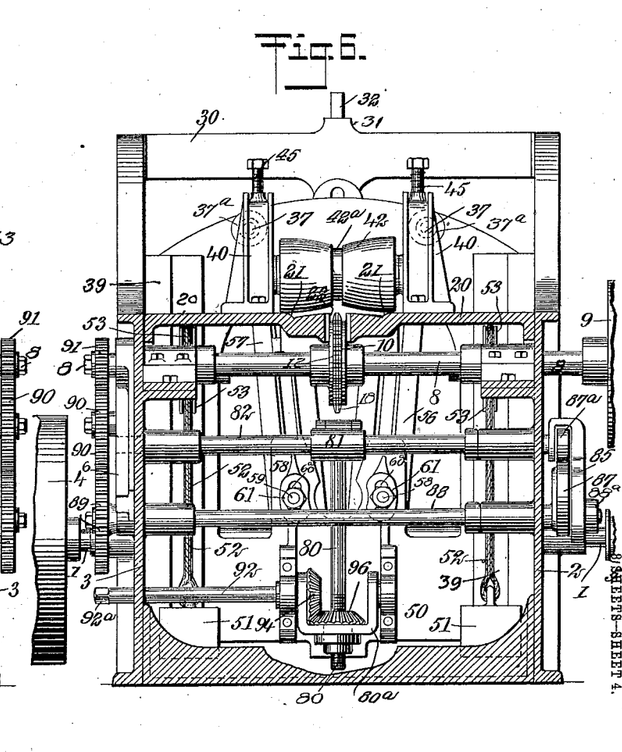
Fig. 6 is a sectional end elevation, as viewed from the left-hand end of Fig. 2.
Figure 8:
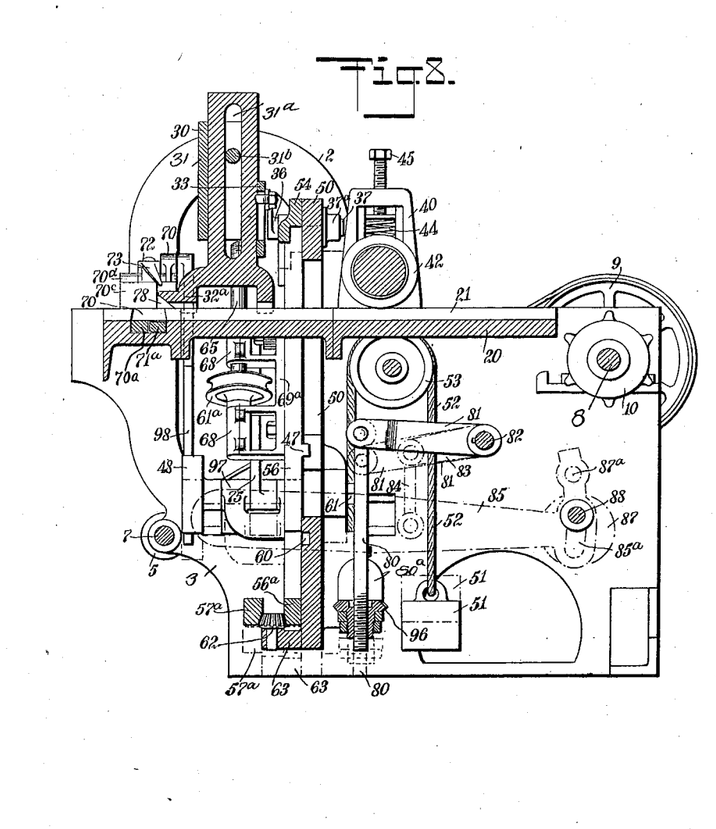
Fig. 8 is a longitudinal vertical section of the main portion of the machine taken on the line 2—2 in Fig. 1 and viewed from the direction opposite that shown in Fig. 2, the feed pedestal and extension plates shown in Fig. 2 being omitted in this figure.
Figure 9:
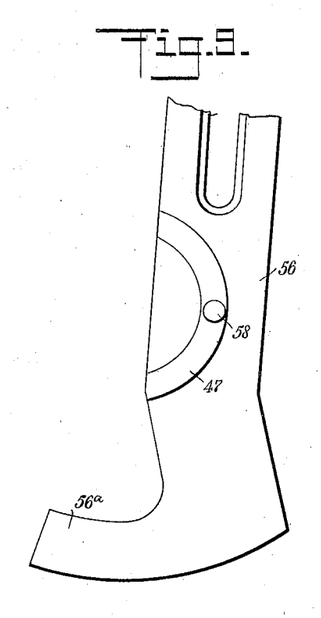
Fig. 9 is a detailed view, on an enlarged scale, fragmentary in form, showing the back of one of the cutter arms.
Figure 10:
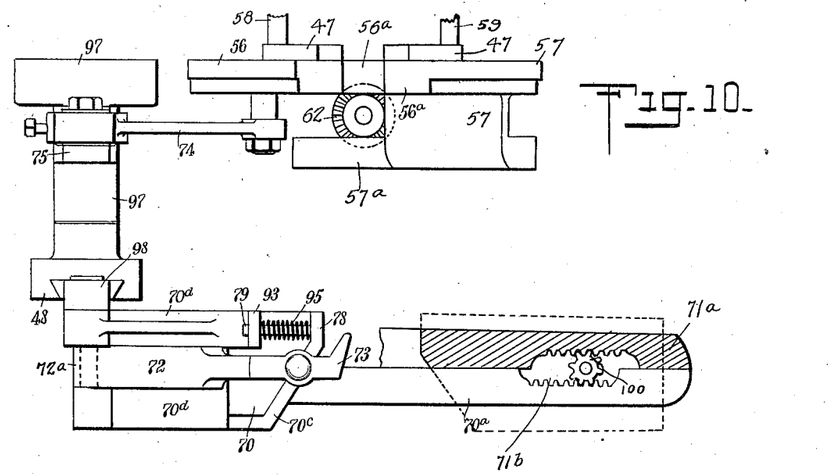
Fig. 10 is a detailed view on an enlarged scale, and in plan, showing one of the spreading gates for the cutter heads showing in connection therewith one of the frames for the cutters and the transmission mechanism operatively connecting both of said gates and frames.

The connection between the rod 80 and the plate 80$^a$ is by means of a miter gear 96. The miter gear 96 is provided with a central perforation which is tapped to receive the screw threaded end of the rod 80, as shown in Figs. 2 and 6 of the drawings. The gear 96 is revolubly mounted in the plate 80$^a$, and is controlled by a miter gear 94, fixedly mounted on the end of the shaft 92, which is extended through the sides of the machine and terminated by the squared end 92$^a$. By revolving the shaft 92, the miter gear 96 may be raised and lowered by reason of the screw threaded engagement of the said rod and gear.

The elevator 50 is counter-balanced by means of weights 51, 51, which are suspended by cables 52, 52, which are reeved over the sheaves 53, 53 and connected to the lower ends of the elevator 50. The weights 51, 51, are suitably regulated to nicely balance the elevator 50, thereby reducing the necessary strain for adjusting the miter gear 96 vertically.

The time relation between the shaft 8 and the shaft 88 is regulated by the chain of gears 89, 90 and 91, and may be altered by any desired alteration in the said gears. This alteration is made only when the length of the staves is varied. The object is that the shaft 88 will make one complete revolution while a stave is passing the cutters 66. To accommodate the change of either the gear 91 or 89 the transmission gear 90 is slidably mounted in a swinging frame 6. The frame 6 is guided by the end of the shaft 82 extending through a slot in the curved extension 7 thereof. See the dotted line construction in Fig. 2 of the drawings.

The extent of the rise and fall of the elevator 50 is regulated by the adjustment of the nut 86 in the slot 85$^b$ to and from the connection between the said lever and the link connection 84. The starting position of the cutters 66 may be varied by raising and lowering the elevator 50 upon the rod 80.

Figure 1:
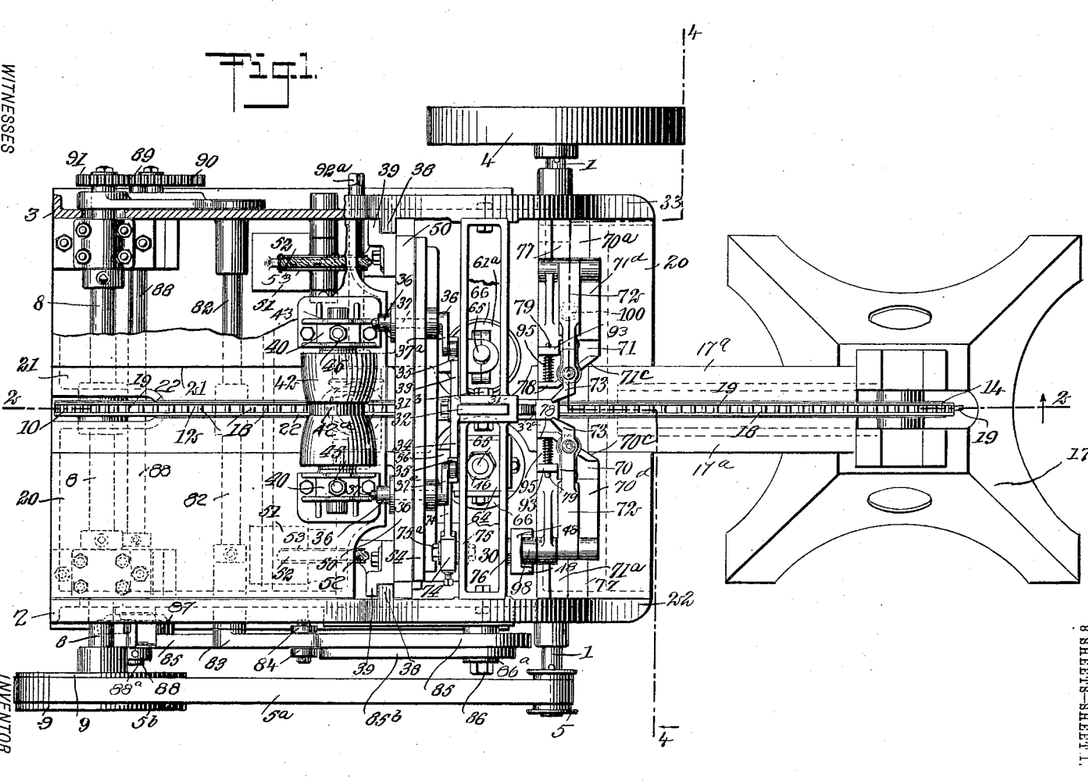
Figure 1 is a plan view of the machine;

To the rear of the presser foot 32 is provided a presser roll 42. The roll 42 is shaped substantially as shown in Fig. 1 of the drawings, having a concave central section. The center is further cut away by a central annular groove 42$^a$, which is provided to avoid the spurs 18 of the chain 12 when the stave is not carried thereby. The roll 42 is provided to maintain the stave in the groove 21 in the table 20. The roll 42 is mounted in bearings 43, guided in the standards 40 and held in position by the compression spring 44, which is interposed between the bearing block 43 and the adjusting set screws 45. The tension of the springs may be varied by setting up or releasing the screw 45.

The beveled faces 70$^c$ and 71$^c$ are mounted directly upon the blocks 70 and 71. They are provided with parallel end extensions 78, 78, on which are mounted the guide pins 79, 79. The guide pins 79 are loosely extended through lugs 93, 93, mounted on the blocks 70$^d$ and 71$^d$. Infolding the pins 79 and extended between the ends 78 and the lugs 93 are coiled expansion springs 95, 95, which maintain the beveled faces in guiding relation to the staves. The blocks 70 and 71 to which the beveled ends are connected pass under the eccentric ends 72$^a$ of levers 72, 72. The levers 72, 72 are pivoted in the plates 70$^d$ and 71$^d$ in such manner that the peak of the eccentric impinges upon the blocks 70 and 71, as shown in Figs. 4 and 11 of the drawings. The forward ends of the levers 72 are provided with extended finger ends 73, 73, which extend over the presser foot 32$^a$. When the levers 72, 72 are in the position shown in Fig. 4 of the drawings, the levers 72 lock the blocks 70 and 71. As above stated, the lateral shift of the blocks 70 and 71 also shifts the frames 56 and 57 carrying the cutters 66, 66. Also it has been stated that when the stave passes under the presser foot 32$^a$, the frames 56 and 57 become locked in position, and are not thereafter laterally shifted. It is necessary, however, that any irregular and widened portion of the stave should pass between the end extensions 78, 78. To accommodate this, it is necessary that the blocks 70 and 71 should yield laterally without carrying the blocks 70$^d$ and 71$^d$, which are connected to move with the frames 56 and 57. By means of the arrangement above described, whereby the ends 73, 73 of the levers 72, 72 rest over the presser foot 32; when the stave lifts the said presser foot by passing under the same, it lifts the ends 73, 73, and the levers 72, 72, sufficiently for the said levers to release the blocks 70 and 71. This action permits the passage of the stave under the presser foot 32$^a$ and between the cutters 66 without disturbing the fixed position of the frames 56 and 57 connected therewith. At the same time the staves are guided by the ends 78, 78, under pressure of the springs 95, 95. When the stave passes from under the rear end 32$^b$ of the presser foot 32, the said presser foot drops, thereby lowering the levers 72, 72, into position to clamp rigidly the blocks 70 and 71 by the eccentric 72$^a$. At the same moment, by reason of the presser foot 32 dropping, the arms 36, 36, are lowered to rotate the shafts 37, 37, to release the plate 54 and the frames 56 and 57. This permits the springs 67, 67 to force inward the frames 56 and 57 carrying the cutters 66, 66, and through the connections between the said frames and the blocks 70 and 71 to force inward the said blocks, placing the machine in position to receive the next stave.

The cutter arbors 65, 65 are driven by a flexible belt passed over the pulleys 61$^a$, 61$^a$. The driving mechanism for the said belt is operated at any suitable point outside of the frame of the machine.

In preparing the machine for operation, the dogs 19, 19, are placed on the chain 12 at intervals greater in length than the staves to be treated. The chain of gears 89, 90 and 91 are arranged with respect to the length of the staves to be formed, in the manner as above set forth. The nuts are slackened on the pivots 58, 59, and the frames 56 and 57 are shifted to adjust the pivotal center on which the said frames move when the staves are pushed through the extensions 78, 78 of the blocks 70, 71, which rises in accordance with the diameter of the barrel for which the staves are intended. The gears 89, 90 and 91 are arranged, and, if necessary, changed to cause one complete revolution of the shaft 88, and thereby one complete reciprocation of the elevator 50 and the cutters 66, 66 carried thereon. The machine is in this position ready for operation.

The staves are manually fed upon the chain 12 on the extension 17ª. They rest against one of the dogs 19. When the stave strikes upon the inclined faces 70ᶜ and 71ᶜ, the blocks 70 and 71 are separated, and operate through the connections above described to separate the arbors 65, 65. In this position the staves pass under the presser foot 32ª and raise the same. This lifts the extensions 34, 34, upward under the free end of the crank arms 36, 36, which clamp the plate 54 in locking position upon the ends of the frames 56 and 57. The stave now passes under the presser foot and between the cutters 66, 66, where the opposite edges are trimmed. From the cutter 66 the stave is advanced under the holding rolls 42.

The machine is so adjusted that when the forward end of the stave is brought in contact with the cutters 66, 66, the elevator 50 is raised in its highest position. The cutters 66, 66 are inclined relatively and the lower ends most nearly approach. The lower and more nearly approximated ends of the cutters first operate upon the staves. With the passage of the stave under the presser foot 32ª, the blocks 70 and 71 have been released. As the stave is advanced any irregularity in the width thereof is accommodated by the said blocks 70 and 71 yielding laterally against the pressure of the springs 95, 95. The pressure of the springs 95 serves to center the staves while being fed to the cutters. During the cutting of the completed stave, the elevator 50 is depressed to its lowest position when the middle of the stave is between the cutters 66, 66. The upper ends of the cutters are most widely diverged, and, therefore, the stave, after being cut by the said upper ends of the cutters, is wider than the ends of the staves which are cut by the lower ends of the cutters, and all intermediate dimensions are gradually increased and diminished as the stave passes between the cutters. Throughout the cutting, however, it will be observed that the angle of the cut is constant.

The elevator 50 is guided in its rise and fall by the flanges 38, 38, which extend behind the elevator, as shown in Fig. 1 of the drawings. Bolted to the elevator 50 are the rabbeted edge pieces 39, 39, which extend over the flanges 38, 38, to form in conjunction with the elevator 50 a groove for guiding the said elevator in its rise and fall. It is to the lower ends of the edge pieces 39, 39, that are secured the anchored ends of the cables 52, 52, which support the counterbalancing weights 51, 51, for the elevator.

Having thus described my invention, I claim as new and desire to secure by Letters Patent:

1. A stave jointing machine having, in combination; a reciprocating frame; means for reciprocating said frame; a plurality of swinging frames mounted on said reciprocating frame to swing about a common axis; a compensating mechanism connecting said swinging frames to move the same in unison; a plurality of rotary cutting mechanisms, one mounted on each of said swinging frames, and embodying each a rotary shaft and an elongated cylindrical cutter head; a driving mechanism for simultaneously operating said shafts and cutter heads; a stave-feeding mechanism, embodying a conveyer to move staves between said swinging frames and said cutter heads; a plurality of spreading gates disposed at opposite sides of said conveyer, said gates being normally held in juxtaposition to said conveyer and in the path of staves mounted thereon; a compensating mechanism connecting said gates to relatively synchronize the movement thereof; means operatively connecting said gates with said swinging frames to operate the same in unison; means for locking said swinging frames on said reciprocating frame, said means being actuated by each stave coincident with the passage of the initial end thereof between said gates; and means connecting said feeding mechanism and said reciprocating frame to operate the same in unison.

2. A stave jointing machine, having, in combination; a reciprocating frame; means for reciprocating said frame; a plurality of swinging frames pivotally mounted on said reciprocating frame, each of said swinging frames having an arcuate gear-toothed rack segment, said segments being spaced apart and disposed to present the teeth thereof in opposite relation; a connecting gear wheel meshed with the teeth of said segments; a plurality of rotary cutting mechanisms, one mounted on each of said swinging frames, and embodying each a rotary shaft and an elongated cylindrical cutter head; a stave-feeding mechanism, embodying a conveyer to move staves between said swinging frames and said cutter heads; a plurality of spreading gates disposed at opposite sides of said conveyer, said gates being normally held in juxtaposition to said conveyer and in the path of staves mounted thereon; a transmission mechanism operatively connecting one of said swinging frames and one of said gates, to move the same in unison; a compensating mechanism connecting said gates to relatively synchronize the movement thereof; means for locking said swinging frames on said reciprocating frame, said means being actuated by each stave coincident with the passage of the initial end thereof between said gates; and means connecting said feeding mechanism and said reciprocating frame to operate the same in unison.

3. A stave jointing machine, having, in combination; a reciprocating frame; means for reciprocating said frame; a plurality of swinging frames mounted on said reciprocating frame to swing about a common axis; a compensating mechanism connecting said swinging frames to move the same in unison; a stave-feeding mechanism, embodying a conveyer to move staves between said swinging frames and said cutter heads; a plurality of spreading gates disposed at opposite sides of said conveyer, said gates being normally held in juxtaposition to said conveyer and in the path of staves mounted thereon; a transmission mechanism operatively connecting one of said gates and one of said swinging frames to operate said gate and frame in unison, said transmission mechanism embodying a rocking arm and a connecting pitman, said pitman being movable on said arm to vary the effective stroke of said arm and the movement of said swinging frame connected therewith; a compensating mechanism connecting said gates, to relatively synchronize the movement thereof; and means connecting said feeding mechanism and said reciprocating frame to operate the same in unison.

4. A stave jointing machine, having, in combination; a reciprocating frame; means for reciprocating said frame; a plurality of swinging frames mounted on said reciprocating frame to swing about a common axis; a compensating mechanism connecting said swinging frames to move the same in unison; a plurality of rotary cutting mechanisms, one mounted on each of said swinging frames, and embodying each a rotary shaft and an elongated cylindrical cutter head; a driving mechanism for simultaneously operating said shafts and cutter heads; a stave-feeding mechanism, embodying a conveyer to move staves between said swinging frames and said cutter heads; a plurality of spreading gates disposed at opposite sides of said conveyer, said gates being normally held in juxtaposition to said conveyer and in the path of staves mounted thereon; a compensating mechanism connecting said gates to relatively synchronize the movement thereof; means operatively connecting said gates with said swinging frames, to operate the same in unison; means for locking said swinging frames on said reciprocating frame; said means being actuated by each stave coincident with the passage of the initial end thereof between said gates; means connecting said feeding mechanism and said reciprocating frame to operate the same in unison; means for varying the operative position of said reciprocating frame; and means for varying the extent of movement of said reciprocating frame.

5. In a stave jointing machine wherein is provided a reciprocating frame, paired cutters adjustably mounted thereon to vary the mutual angular arrangement thereof, and a feed mechanism for moving staves to and between said cutters; means for automatically adjusting said cutters, said means being independently actuated by each of the staves while moved by said feed mechanism and prior to the introduction of said staves between said cutters; means for locking said cutters in adjusted position, said means being actuated by the staves subsequent to the adjustment of said cutters and prior to the staves passing between said cutters; means for releasing said cutters after each stave has passed completely between the same; and means for returning said cutters, when so released, to a normal position.

6. In a machine such as described, having a reciprocating frame and a feed conveyer operating perpendicular to said frame; a plurality of cutters having arbors pivotally mounted to swing about a common center to move to and from the said conveyer at opposite sides thereof; a plurality of spreading gate members slidably mounted at opposite sides of said conveyer, in front of said cutters; a transmission mechanism for operatively connecting said gate members and said arbors, to swing said arbors concordantly with the spread of said gate members; and means for releasing said transmission mechanism and said gate members, said means being actuated by the initial end of each stave after passing between said gate members.

7. In a machine such as described, having a reciprocating frame and a feed conveyer operating perpendicular to said frame; a plurality of cutters having arbors pivotally mounted to swing about a common center to move to and from the said conveyer at opposite sides thereof; a plurality of spreading gate members slidably mounted at opposite sides of said conveyer, in front of said cutters; a transmission mechanism for operatively connecting said gate members and said arbors, to swing said arbors concordantly with the spread of said gate members; means for releasing said transmission mechanism and said gate members, said means being actuated by the initial end of each stave after passing between said gate members; and means automatically operated to return said gate members and said cutting mechanism to their normal position after each stave has passed from between said cutters.

8. In a machine such as described, having a reciprocating frame and a feed conveyer operating perpendicular to said frame; a plurality of cutters having arbors pivotally mounted to swing about a common center to move to and from the said conveyer at opposite sides thereof; a plurality of gate blocks slidably mounted at opposite sides of said conveyer, said blocks being adapted to be separated by the insertion of the initial end of each stave therebetween; means connecting said blocks to synchronize the movement thereof; a plurality of locking plates slidably mounted upon said blocks; a plurality of resilient connections between said blocks and said locking plates; and a plurality of locking levers for connecting said plates, transmission mechanism, and arbors with said gate blocks, said levers extending in the path of the staves to be moved by the initial end thereof when fully inserted between said gate blocks, to release said gate blocks and locking plates, to permit thereafter the adjustment of said gate blocks to conform to the shape of the staves in passing between said gate blocks.

9. In a machine such as described, having a reciprocating frame and a feeding conveyer operating perpendicular to said frame; a plurality of cutters having arbors pivotally mounted to swing about a common center to move to and from said conveyer at opposite sides thereof; a plurality of gate blocks disposed one at each side of said conveyer, each of said blocks having an inclined face to engage the initial end of each stave to be spread thereby; a plurality of extension arms disposed in sliding relation and having each oppositely disposed a rack toothed section; a pinion engaging the teeth of said toothed section, to synchronize the movements of said gate blocks; a plurality of locking plates slidably mounted on said gate blocks; means for normally locking said plates on said blocks; a transmission mechanism operatively connecting said arbors and said plates to synchronize the movement of said arbors and gate blocks; means for locking in position said arbors when spread by said gate blocks, said means embodying a presser foot normally juxtaposed to said conveyer in the path of the staves to be engaged by the initial end thereof after passing between said gate blocks, and means connected with the presser foot for releasing said locking plates and gate blocks; and yielding means to normally move said gate blocks toward said conveyer.

10. In a machine such as described, having a reciprocating frame and a feeding conveyer operating perpendicular to said frame; a plurality of cutters having arbors pivotally mounted to swing about a common center to move to and from said conveyer at opposite sides thereof; a plurality of gate blocks disposed one at each side of said conveyer, each of said blocks having an inclined face to engage the initial end of each stave to be spread thereby; a plurality of extension arms disposed in sliding relation and having each oppositely disposed a rack toothed section; a pinion engaging the teeth of said toothed section, to synchronize the movements of said gate blocks; a plurality of locking plates slidably mounted on said gate blocks; means for normally locking said plates on said blocks; a transmission mechanism operatively connecting said arbors and said plates to synchronize the movement of said arbors and gate blocks; means for locking in position said arbors when spread by said gate blocks, said means embodying a presser foot normally juxtaposed to said conveyer in the path of the staves to be engaged by the initial end thereof after passing between said gate blocks, and means connected with the presser foot for releasing said locking plate and gate blocks; yielding means to normally move said gate blocks toward said conveyer; means for maintaining in operative position said presser foot and parts connected therewith to maintain the locked position of said arbors until each stave has passed completely between said cutters; and means for moving said arbors and said locking plates toward said conveyer when so released.

In testimony whereof I have signed my name to this specification in the presence of two subscribing witnesses.

JULIUS JOHN KROHN.

Witnesses:
HENRY A. KOSTER,
W. B. SWEET.

Copies of this patent may be obtained for five cents each, by addressing the "Commissioner of Patents, Washington, D. C."